(12) United States Patent
Watanabe et al.

(10) Patent No.: US 9,143,640 B2
(45) Date of Patent: Sep. 22, 2015

(54) DISPLAY APPARATUS AND INPUT APPARATUS

(75) Inventors: Toshinari Watanabe, Nagoya (JP);
Masaaki Wakizaka, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1105 days.

(21) Appl. No.: 12/748,294

(22) Filed: Mar. 26, 2010

(65) Prior Publication Data

US 2011/0074707 A1    Mar. 31, 2011

Related U.S. Application Data

(63) Continuation-in-part of application No. 12/648,093, filed on Dec. 28, 2009, and a continuation-in-part of application No. 12/698,078, filed on Feb. 1, 2010.

(30) Foreign Application Priority Data

Sep. 30, 2009    (JP) ................. 2009-227313

(51) Int. Cl.
*G06F 3/041*    (2006.01)
*H04N 1/00*    (2006.01)
(Continued)

(52) U.S. Cl.
CPC ........ *H04N 1/00352* (2013.01); *G06F 3/03547* (2013.01); *G06F 3/0488* (2013.01);
(Continued)

(58) Field of Classification Search
CPC ... G06F 3/0488; G06F 3/04883; G06F 3/044; G06F 3/045; G06F 3/04886; G06F 3/04847; H04N 1/00384; H04N 1/00395; H04N 1/00411; H04N 1/00442; H04N 1/00458; H04N 1/00352; H04N 1/0039; H04N 1/00408; H04N 1/00435; H04N 1/00448; H04N 2201/0094
USPC ............................ 345/173; 715/863; 714/864
See application file for complete search history.

(56) References Cited

U.S. PATENT DOCUMENTS 5,877,758 A    3/1999    Seybold
6,191,785 B1    2/2001    Bertram et al.
(Continued)

FOREIGN PATENT DOCUMENTS

EP    0795811 A1    9/1997
JP    H04-278627 A    10/1992
(Continued)

OTHER PUBLICATIONS

European Patent Office; Extended European Search Report in European Patent Application No. 09252852.0 (counterpart to the above-captioned U.S. patent application) mailed Apr. 23, 2010.
(Continued)

*Primary Examiner* — Towfiq Elahi
(74) *Attorney, Agent, or Firm* — Baker Botts L.L.P.

(57) ABSTRACT

A display apparatus, wherein a display controller configured to perform a first display processing in which display informations from a starting point display number to a second target display number which is between the starting point display number and a first target display number corresponding to an approach-touch area are displayed on a display portion as to-be-displayed informations such that a difference between the display number of the to-be-displayed informations displayed at a start and an end of a unit time is a first value, and then perform a second display processing in which display informations from the second target display number to the first target display number are displayed as the to-be-displayed informations such that a difference between the display number of the to-be-displayed informations displayed at a start of an end of the unit time is a second value which is smaller than the first value.

14 Claims, 8 Drawing Sheets

(51) Int. Cl.
*G06F 3/0354* (2013.01)
*G06F 3/0484* (2013.01)
*G06F 3/0485* (2013.01)
*G06F 3/0488* (2013.01)

(52) U.S. Cl.
CPC ........ *G06F3/04847* (2013.01); *G06F 3/04855* (2013.01); *H04N 1/00384* (2013.01); *H04N 1/00392* (2013.01); *H04N 1/00395* (2013.01); *H04N 1/00408* (2013.01); *H04N 1/00411* (2013.01); *H04N 1/00435* (2013.01); *H04N 1/00442* (2013.01); *H04N 1/00448* (2013.01); *H04N 1/00458* (2013.01); *H04N 2201/0094* (2013.01)

(56) References Cited

U.S. PATENT DOCUMENTS

| | | | |
|---|---|---|---|
| 6,222,541 B1* | 4/2001 | Bates et al. | 715/786 |
| 7,345,675 B1* | 3/2008 | Minakuchi et al. | 345/173 |
| 7,479,948 B2 | 1/2009 | Kim et al. | |
| 2002/0118386 A1 | 8/2002 | Sakai | |
| 2002/0176016 A1 | 11/2002 | Misawa et al. | |
| 2003/0142081 A1 | 7/2003 | Iizuka et al. | |
| 2004/0046887 A1 | 3/2004 | Ikehata et al. | |
| 2004/0128317 A1 | 7/2004 | Sull et al. | |
| 2004/0175764 A1 | 9/2004 | Nishiyama et al. | |
| 2005/0226477 A1 | 10/2005 | Tanaka | |
| 2006/0048071 A1* | 3/2006 | Jarrett et al. | 715/784 |
| 2006/0109259 A1 | 5/2006 | Ohta | |
| 2006/0284858 A1 | 12/2006 | Rekimoto | |
| 2007/0080953 A1* | 4/2007 | Lii | 345/173 |
| 2007/0097245 A1 | 5/2007 | Battles et al. | |
| 2007/0247441 A1 | 10/2007 | Kim et al. | |
| 2007/0262965 A1 | 11/2007 | Hirai et al. | |
| 2007/0276525 A1 | 11/2007 | Zadesky et al. | |
| 2008/0046836 A1 | 2/2008 | Maruyama et al. | |
| 2008/0112005 A1 | 5/2008 | Murray et al. | |
| 2008/0297536 A1* | 12/2008 | Matsuno et al. | 345/684 |
| 2008/0301569 A1 | 12/2008 | Akagi | |
| 2010/0107116 A1* | 4/2010 | Rieman et al. | 715/784 |
| 2010/0167800 A1 | 7/2010 | Wakizaka et al. | |
| 2010/0194706 A1 | 8/2010 | Watanabe et al. | |
| 2010/0269038 A1* | 10/2010 | Tsuda | 715/702 |
| 2011/0074707 A1 | 3/2011 | Watanabe et al. | |

FOREIGN PATENT DOCUMENTS

| | | |
|---|---|---|
| JP | H08-076926 A | 3/1996 |
| JP | H09-244813 A | 9/1997 |
| JP | 2002-182847 A | 6/2002 |
| JP | 2004-139321 A | 5/2004 |
| JP | 2006-268073 A | 10/2006 |
| JP | 2006-345209 A | 12/2006 |
| JP | 2008-299534 A | 12/2008 |

OTHER PUBLICATIONS

The State Intellectual Property Office of the People's Republic of China, Notification of First Office Action for Chinese Patent Application No. 200910265667.3 (counterpart to above-captioned patent application), issued Nov. 24, 2011.

Japan Patent Office, Notification of Reason for Refusal for Japanese Patent Application No. 2008-334132 (counterpart to co-pending U.S. Appl. No. 12/648,093), mailed Dec. 21, 2010.

Japan Patent Office, Decision of Refusal for Japanese Patent Application No. 2008-334132 (counterpart to above-captioned patent application), dispatched Mar. 15, 2011.

United States Patent and Trademark Office, Office Action for related U.S. Appl. No. 12/698,078, mailed Oct. 12, 2012.

United States Patent and Trademark Office, Office Action for related U.S. Appl. No. 12/698,078, mailed May 21, 2012.

United States Patent and Trademark Office, Office Action for related U.S. Appl. No. 12/648,093, mailed Mar. 20, 2012.

United States Patent and Trademark Office, Office Action for related U.S. Appl. No. 12/648,093, mailed Oct. 4, 2012.

* cited by examiner

FIG.2A

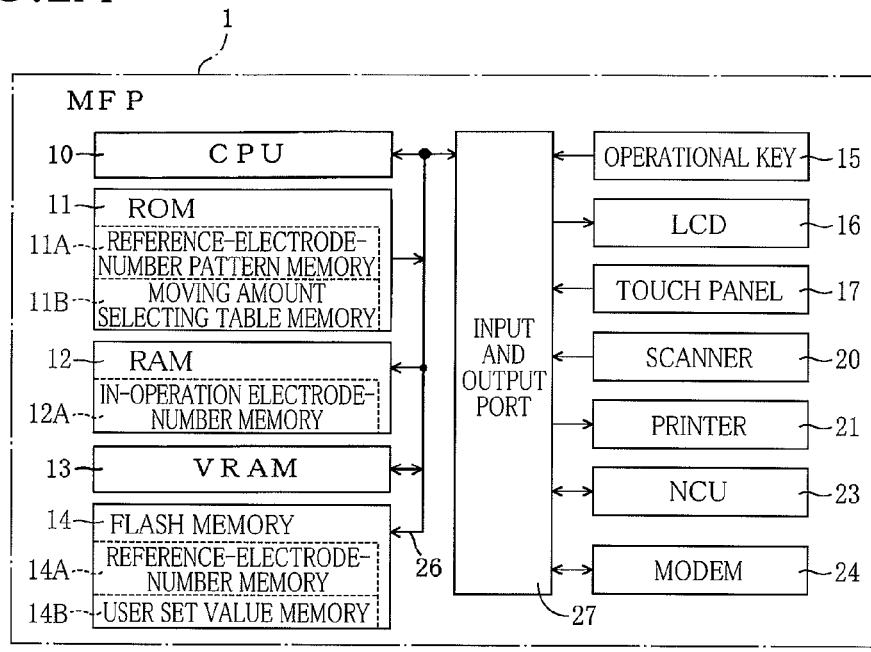

FIG.2B  EXAMPLE OF CONTENT OF MOVING-AMOUNT SELECTING TABLE

| ELECTRODE-NUMBER CHANGE RATE A | A<0.2 | 0.2≦A<1.0 | (NO CHANGE) A=1 | 1.0<A≦1.5 | 1.5<A≦2.0 | 2.0<A |
|---|---|---|---|---|---|---|
| MOVING-AMOUNT CHANGE RATE | 0.2 | 0.5 | 1 | 1.5 | 3 | 5 |

FIG.2C  EXAMPLE OF DETECTING AREA (ELECTRODE) DETECTING TOUCH WHERE USER'S FINGER HAS TOUCHED

PART OF ENTIRE DETECTING AREA OF TOUCH PANEL

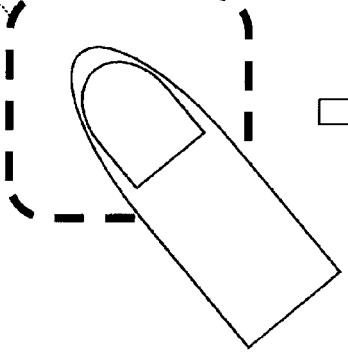

PART OF ENTIRE DETECTING AREA OF TOUCH PANEL

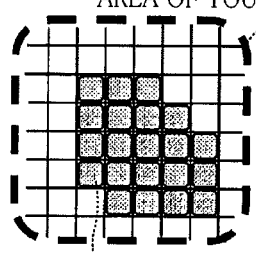

EXAMPLE OF DETECTING AREA (ELECTRODE) HAVING DETECTED TOUCH

DRAGGING SLIDER

DISPLAYING SLIDER AT POSITION WHOSE DISTANCE IS k TIMES LARGER THAN THAT OF FINGER POSITION ($0 < k < 1$)

REPLACING IMAGES BY FIRST MOVING AMOUNT BY FINGER FOLLOWING PROCESSING

STOPPING REPLACEMENT OF IMAGES AND WAITING

STOPPING FINGER AT ENDING POINT OF DRAGGING OPERATION

STARTING REDUCING PROCESSING (SECOND MOVING AMOUNT=18)

FINGER STOPPING TIME IS EQUAL TO OR LARGER THAN ONE SECOND

DURING REDUCING PROCESSING (SECOND MOVING AMOUNT=6)

DURING REDUCING PROCESSING SECOND MOVING AMOUNT IS INCREASED (SECOND MOVING AMOUNT=12)

INCREASING NUMBER OF FINGERS

STOPPING REPLACEMENT OF IMAGES

RELEASING FINGER

DISPLAY APPARATUS AND INPUT APPARATUS

INCORPORATION BY REFERENCE

This is a Continuation-In-Part application of U.S. patent application Ser. No. 12/648,093 filed on Dec. 28, 2009 entitled "INPUTTING APPARATUS" and U.S. patent application Ser. No. 12/698,078 filed on Feb. 1, 2010 entitled "INPUTTING APPARATUS AND STORAGE MEDIUM STORING PROGRAM." U.S. patent application Ser. Nos. 12/648,093 and 12/698,078 are herein incorporated by reference in its entirety including all references disclosed therein. The present application also claims priority from Japanese Patent Application No. 2009-227313, which was filed on Sep. 30, 2009, the disclosure of which is herein incorporated by reference in its entirety.

BACKGROUND OF THE INVENTION

1. Field of the Invention

The present invention relates to a display apparatus and an input apparatus.

2. Description of the Related Art

There is known an apparatus configured to change a display position of a slider on a slide bar displayed on a display surface on the basis that a user has touched the slider and slides or drags his or her finger on the display surface, and configured to perform display for causing the user to visually recognize that informations from information corresponding to a position before the change of the display position of the slider to information corresponding to a position after the change are moved on a display screen in order. As the apparatus of this type, there is a slide-bar operating apparatus in which a total amount of informations to be displayed corresponds to a movable range of a slider, and an amount of informations in which the apparatus can display at a time corresponds to a width of the slider.

SUMMARY OF THE INVENTION

However, in the above-described slide-bar operating apparatus, where the total amount of the informations to be displayed is large compared to the amount of the informations in which the apparatus can display at a time, for example, the user visually recognizes that an enormous amount of informations are moved on the display screen for a relatively short time when the user has only moved the slider slightly. Thus, it is difficult for the user to stop the slider at an appropriate position which corresponds to desired information, thereby arising a problem in which it is difficult for the user to find the desired information.

This invention has been developed in view of the above-described situations, and it is an object of the present invention to provide a display apparatus and an input apparatus each of which allows a user to easily find desired information.

The object indicated above may be achieved according to the present invention which provides a display apparatus comprising: a display portion configured to display a plurality of display informations to which respectively assigned a plurality of display numbers determined on the basis of display order in which the plurality of display informations are displayed on the display portion; an input portion having a detecting area which is constituted by a plurality of areas respectively corresponding to the plurality of display numbers and in which input by an input object is detected in each of the plurality of areas; a detecting section configured to detect an approach-touch area of the detecting area where at least a part of the detecting area is in an approach-touch state in which the input object has approached or touched the detecting area, the approach-touch area being an area the input object has approached or touched; an obtaining section configured to obtain, as a first target display number, one of the plurality of display numbers which corresponds to the approach-touch area detected by the detecting section, and configured to obtain another of the plurality of display numbers as a second target display number between the first target display number and a starting point display number which is a number corresponding to display information having been displayed on the display portion before the detecting area becomes the approach-touch state; and a display controller configured to perform a first display processing in which the display controller controls the display portion such that at least part of the display informations whose respective display numbers range from the starting point display number to the second target display number are displayed as to-be-displayed informations in the display order such that a difference between the display number of the to-be-displayed informations displayed at a start of a unit time and the display number of the to-be-displayed informations displayed at an end of the unit time is a first value, and configured to perform, after the display information corresponding to the second target display number has become one of the to-be-displayed informations in the first display processing, a second display processing in which the display controller controls the display portion such that at least part of the display informations whose respective display numbers range from the second target display number to the first target display number are displayed as the to-be-displayed informations in the display order such that a difference between the display number of the to-be-displayed informations displayed at a start of the unit time and the display number of the to-be-displayed informations displayed at an end of the unit time is a second value which is smaller than the first value.

The object indicated above may also be achieved according to the present invention which provides An input apparatus comprising: a display portion configured to display a plurality of display informations to which respectively assigned a plurality of display numbers determined on the basis of display order in which the plurality of display informations are displayed on the display portion; an input portion having a detecting area which is constituted by a plurality of areas respectively corresponding to the plurality of display numbers and in which input by an input object is detected in each of the plurality of areas; a detecting section configured to detect an approach-touch area of the detecting area where at least a part of the detecting area is in an approach-touch state in which the input object has approached or touched the detecting area, the approach-touch area being an area the input object has approached or touched; an obtaining section configured to obtain, as a first target display number, one of the plurality of display numbers which corresponds to the approach-touch area detected by the detecting section, and configured to obtain another of the plurality of display numbers as a second target display number between the first target display number and a starting point display number which is a number corresponding to display information having been displayed on the display portion before the detecting area becomes the approach-touch state; and a display controller configured to perform a first display processing in which the display controller controls the display portion such that at least part of the display informations whose respective display numbers range from the starting point display number to the second target display number are displayed as to-bedisplayed informations in the display order such that a difference between the display number of the to-be-displayed informations displayed at a start of a unit time and the display number of the to-be-displayed informations displayed at an end of the unit time is a first value, and configured to perform, after the display information corresponding to the second target display number has become one of the to-be-displayed informations in the first display processing, a second display processing in which the display controller controls the display portion such that at least part of the display informations whose respective display numbers range from the second target display number to the first target display number are displayed as the to-be-displayed informations in the display order such that a difference between the display number of the to-be-displayed informations displayed at a start of the unit time and the display number of the to-be-displayed informations displayed at an end of the unit time is a second value which is smaller than the first value.

BRIEF DESCRIPTION OF THE DRAWINGS

The objects, features, advantages, and technical and industrial significance of the present invention will be better understood by reading the following detailed description of an embodiment of the invention, when considered in connection with the accompanying drawings, in which:

FIG. 2A is a block diagram showing an electric construction of the MFP, FIG. 2B is a schematic view showing an example of a content of a moving-amount selecting table, and FIG. 2C is a schematic view showing an example of an electrode which detects touch of a user's finger where the finger has touched a touch panel;

DESCRIPTION OF THE EMBODIMENT

Figure 1A:
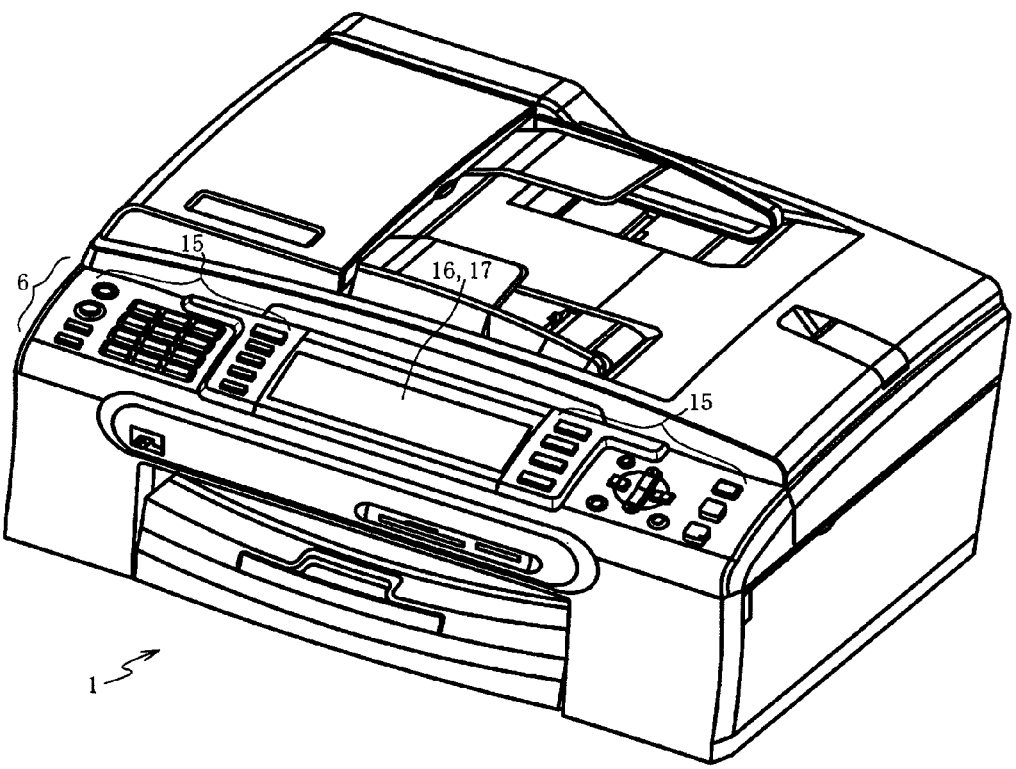
FIG. 1A is a perspective view showing an external structure of a multi-function peripheral (MFP) as an example of a display apparatus and an input apparatus of the present invention.

Hereinafter, there will be described an embodiment of the present invention by reference to the drawings.

A multi-function peripheral (MFP) 1 has various functions such as a printer function, a scanner function, a facsimile function, and a copying function. On an upper front portion of the MFP 1, there is provided an operational panel 6 having an elongated shape. This operational panel 6 is for operating the MFP 1 and mainly includes operational keys 15, an LCD 16 as a display portion, and a touch panel 17 as an input portion.

The touch panel 17 as an input device is provided on a display surface of the LCD 16. An entire surface of the touch panel 17 is minutely separated into a plurality of areas like a grid (for example, with 1 mm pitches), and an electrode (i.e., a sensor) for detecting a touch of a finger is provided in each of the areas (hereinafter may be referred to as "detecting areas"). Each detecting area is sufficiently smaller than an area of the finger which touches the touch panel 17, and thus where the user's finger has touched the touch panel 17, a plurality of the detecting areas are touched by the finger.

Further, an identification number is assigned to each detecting area for individually identifying the detecting areas. Where the identification number of an uppermost and leftmost detecting area on the touch panel 17 is defined as (0, 0), the identification numbers (x, y) are assigned so as to be continuous in an X direction (i.e., a lateral direction in the touch panel 17) and in a Y direction (i.e., a vertical direction of the touch panel 17). It is noted that the identification numbers increase in a rightward direction and a downward direction in the touch panel 17.

In this touch panel 17, where a touch of an input object such as the finger has been detected, all of ones of the detecting areas which are being touched by the finger are specified. A CPU 10 (with reference to FIG. 2A) performs a processing corresponding to each detecting area of the identification number (x, y) which has been detected on the touch panel 17.

In this MFP 1, where the user selects a desired one of a plurality of image files as display images (for example, a file for which the user wants to perform recording) stored in, e.g., a storage device connected to the MFP 1 or a flash memory 14 of the MFP 1, a slide display of the files (in which the files are displayed so as to be slid) is performed on the LCD 16. In this slide display, continuous display numbers are respectively assigned to all the files in order (i.e., display order), and images respectively based on a predetermined number of ones of all the files which have continuous display numbers are displayed so as to be arranged in ascending order. Then, where not all the files can be displayed at a time because the number of the files is too large, a certain number of the images being displayed are repeatedly replaced with or changed to other images in accordance with the display order and the display numbers, whereby the user can visually recognize that the images are moved on the LCD 16 in order and view all the files. That is, the slide display includes a scroll display and a display in which all images displayed on the LCD 16 are replaced at a time.

In particular, this MFP 1 is configured such that the user can easily find a desired image from a plurality of images displayed on the LCD 16 in the slide display.

Figure 1B:
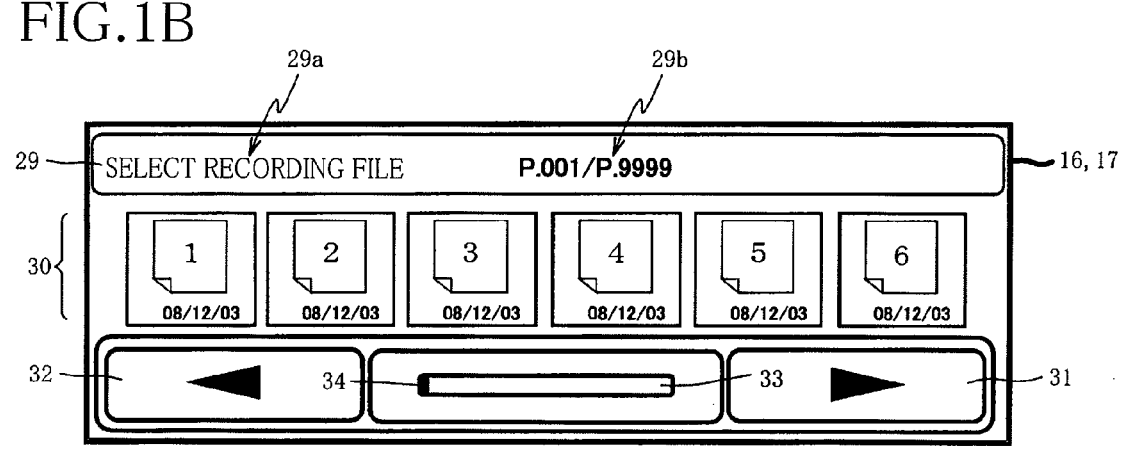
FIG. 1B is a schematic view showing an example of an operation screen displayed on an LCD.

FIG. 1B shows an example of an operation screen displayed on the LCD 16 during the slide display. As shown in FIG. 1B, in the slide display, there are displayed a title display area 29, an image display area 30, a right scroll key 31, a left scroll key 32, a slide bar 33, and a slider 34 as a position indicator in order from an upper side from a lower side of the LCD 16.

The title display area 29 is an area on which a title 29a and a page number 29b of the operation screen are displayed.

A predetermined number (e.g., six) of images are displayed on the image display area 30 such that display numbers of respective files based on which the images are respectively produced (hereinafter may be simply referred to as "display numbers of respective images") increase in the display order from a left end toward a right end. In FIG. 1B, the display numbers are respectively assigned in the display order to the images being displayed, for easy recognition of the display order of the images. That is, FIG. 1B shows that images of respective display numbers 1-6 are displayed. In the present embodiment, a single page is defined to include six images which can be displayed on the LCD 16 at a time. Further, a value obtained by dividing the number of all the files by six and rounding up its remainder is displayed as a denominator of the page number 29b ("9999" in the example shown in FIG.

1B), while a page number being displayed on the image display area 30 is displayed as a numerator of the page number 29b ("001" in the example shown in FIG. 1B). It is noted that a producing date of the file based on which the image is produced may be added to the image with the display number such that the user can recognize the desired one of the images displayed on the image display area 30. Further, each image displayed on the image display area 30 may be a thumbnail image of each file.

When the user's finger has touched the right scroll key 31 displayed on the touch panel 17, the display on the image display area 30 is changed from a page being displayed at the time to a next page. In the case of the operation screen shown in FIG. 1B, when the user's finger has touched the right scroll key 31 displayed on the touch panel 17, the display on the image display area 30 is changed from a page 001 to a page 002. On the other hand, when the user's finger has touched the left scroll key 32 displayed on the touch panel 17, the display on the image display area 30 is changed from the page being displayed at the time to a previous page. It is noted that, in the case of the operation screen shown in FIG. 1B, since the page 001 is the first page, the display on the image display area 30 is not changed even when the user's finger has touched the left scroll key 32 displayed on the touch panel 17.

The slide bar 33 is displayed on a central lower portion of the LCD 16 as a slide-bar display portion. A width of the slide bar 33 in a lateral direction thereof (i.e., a rightward and leftward direction in FIG. 1B) represents a total number of all the files (i.e., display informations). Each of positions or areas in the slide bar 33 in the lateral direction thereof corresponds to one of the display numbers. Specifically, a left end position in the slide bar 33 corresponds to the smallest display number, and the display numbers increase in a rightward direction, so that a right end position in the slide bar 33 corresponds to the largest display number. Thus, an area of the touch panel 17 on which the slide bar 33 is displayed corresponds to ones of the detecting areas each of which corresponds to one of the display numbers.

The slider 34 represents detecting areas respectively corresponding to display numbers of files based on which images being displayed on the image display area 30 are respectively produced. For example, as shown in FIG. 1B, when the images of the respective display numbers 1-6 are being displayed, the slider 34 is located on an area in the slide bar 33, the area corresponding to the display numbers 1-6. Thus, an area of the touch panel 17 on which the slider 34 is displayed normally corresponds to ones of the detecting areas each of which corresponds to one of the display numbers of the images being displayed on the image display area 30.

There will be next explained an electric construction of the MFP 1 with reference to FIG. 2A. The MFP 1 mainly includes the CPU 10, a ROM 11, a RAM 12, a VRAM 13, the flash memory 14, the operational keys 15, the LCD 16, the touch panel 17, a scanner 20, a printer 21, an NCU 23, and a modem 24.

The CPU 10, the ROM 11, the RAM 12, the VRAM 13, and the flash memory 14 are connected to one another via a bus line 26. Further, the operational keys 15, the LCD 16, the touch panel 17, the scanner 20, the printer 21, the NCU 23, the modem 24, and the bus line 26 are connected to one another via an input and output port 27.

The CPU 10 is configured to control the various functions of the MFP 1 and to control various portions of the MFP 1 which are connected to the input and output port 27, in accordance with fixed values and programs stored in the ROM 11, the RAM 12, and the flash memory 14, or in accordance with various signals transmitted and received via the NCU 23.

The ROM 11 is an unrewritable memory which stores, e.g., control programs performed in the MFP 1. The ROM 11 stores programs for executing or performing a display updating processing shown in a flow-chart in FIG. 6 and a slider operation obtaining processing shown in a flow-chart in FIGS. 7 and 8, which processings will be described below.

Further, this ROM 11 includes a reference-electrode-number pattern memory 11a and a moving amount selecting table memory 11b.

There will be next explained an example of a content of a moving-amount selecting table with reference to FIG. 2B. The moving-amount selecting table is a table which is referred for setting a value (i.e., a moving amount) by which the display number is increased in the slide display from the display number of an image displayed at a start of a unit time to the display number of an image displayed at an end of the unit time. This moving-amount selecting table stores a change rate of the number of the electrodes (hereinafter, may be referred to as an electrode-number change rate A) and a moving-amount change rate corresponding to the electrode-number change rate A.

The electrode-number change rate A represents a result of a calculation of dividing an electrode number detected during the inputting operation of the touch panel 17 (specifically, an electrode number in an in-operation electrode-number memory 12a which will be explained below) by a reference electrode number (specifically, an electrode number in a reference-electrode-number memory 14a which will be explained below). Explained below in detail, a second moving amount (i.e., a second value) is obtained by multiplying a first moving amount (i.e., a first value) by a plurality of coefficients. The moving-amount change rate is one of the coefficients used when the second moving amount is determined.

For example, in the moving-amount selecting table, an electrode number change rate "A=1" corresponds to a moving-amount change rate "1". An electrode number change rate A ranging "1<A≤1.5" corresponds to a moving-amount change rate "1.5". An electrode number change rate A ranging "0.2≤A 1.0" corresponds to a moving-amount change rate "0.5". The MFP 1 multiplies the first moving amount by the coefficient corresponding to a size of an area (i.e., a touch area) of the touch of the user's finger, thereby obtaining the second moving amount in accordance with the size of the area of the touch of the user's finger.

Here, returning to the explanation FIG. 2A, the electric construction of the MFP 1 will be described. The RAM 12 is a rewritable volatile memory for temporarily storing various data when various operations of the MFP 1 are performed. The RAM 12 includes the in-operation electrode-number memory 12a.

The in-operation electrode-number memory 12a is a memory for storing, during the touch of the user to the touch panel 17 in the slide display, the total number of the electrodes having detected the touch of the finger(s) in each detecting area in the touch panel 17, as an in-operation electrode number.

The VRAM 13 is a memory for storing bitmap data corresponding to a screenful of a display image displayed on the LCD 16. The CPU 10 regularly reads out the bitmap data stored in the VRAM 13, and displays the display image corresponding to the read bitmap data on the LCD 16.

The flash memory 14 is a rewritable nonvolatile memory. Data stored in this flash memory 14 is kept also after the MFP 1 is turned off. The flash memory 14 includes the reference-electrode-number memory 14a and a user set value memory 14b. The reference-electrode-number memory 14a is a memory for storing in advance, as the reference electrode number, the number of the electrodes the user touches when the user normally operates the touch panel 17. The user set value memory 14*b* is a memory for storing a coefficient k used for determining a second target display number. It is noted that the coefficient k is a value the user can be set at any value within a range of 0<k<1.

There will be next explained, with reference to FIG. 2C, an example of the electrode which detects the touch of the user's finger where the finger has touched the touch panel 17. It is noted that a size of each detecting area shown in FIG. 2C is different from an actual size of each detecting area because each detecting area shown in FIG. 2C is enlarged for an easier understanding purpose.

For example, in an initial setting of the MFP 1, the user is requested to touch the touch panel 17 with one finger (e.g., an index finger) as in the case where the user usually operates the touch panel 17. Here, as shown in FIG. 2C, when the user has touched the touch panel 17 in an ordinary manner, the electrode or electrodes the user is touching on the touch panel 17 with his or her finger are specified, and the total number of the specified electrode(s) is calculated by the CPU 10.

Then, one of the electrode numbers stored in the reference-electrode-number pattern memory 11*a* of the ROM 11, which one is the nearest to the calculated electrode number is selected and stored, as the reference electrode number, into the reference-electrode-number memory 14*a* of the flash memory 14.

As thus described, in the present embodiment, since the area (the electrode number) of the touch of the user's finger operating the MFP 1 is stored in advance, an accuracy of the calculation of the electrode-number change rate A can be improved regardless of the size of the user's finger or the area of the touch of the user's finger.

Figure 3A:
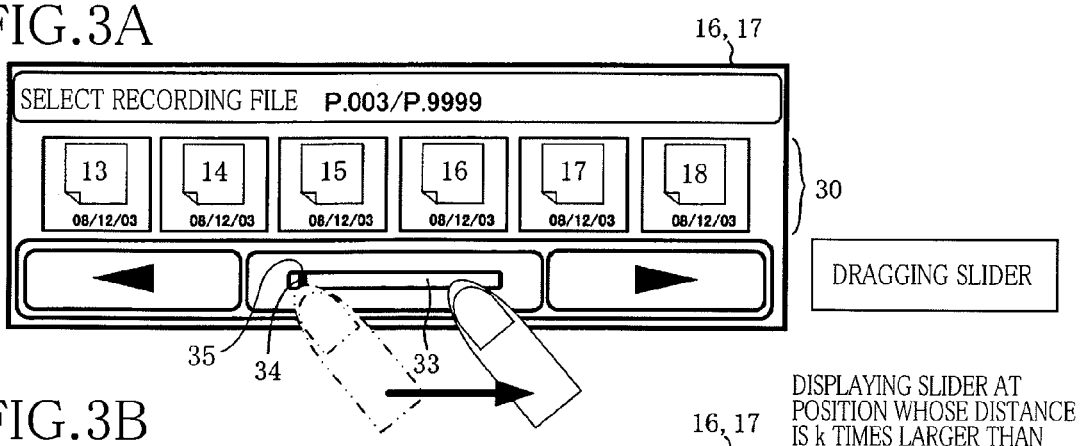
FIGS. 3A to 3D are schematic views for explaining an example of an operation method of a slide bar.

There will be next explained an example of an operation method of the slide bar 33 with reference to FIGS. 3A to 3D. As shown in FIG. 3A, the user initially touches, as a starting point, the slider 34 displayed on the touch panel 17 with his or her finger and then moves the finger rightward on the slide bar 33 while touching the touch panel 17. It is noted that a position at which the slider 34 is displayed on the slide bar 33 at the time before this dragging operation will be referred to as a starting-point display position 35 of the slider 34, and the display number of the image being displayed before this dragging operation will be referred to as a "starting point display number".

Where the dragging operation has been performed in a rightward direction from the starting-point display position 35, the MFP 1 acquires, as a finger-following-processing display position 37 of the slider 34, a position distant from the starting-point display position 35 of the slide bar 33 by a distance (k×x) obtained by multiplying a distance x from the starting-point display position 35 of the slide bar 33 to an ending point position 36 as an ending point of the dragging operation by the coefficient k (0<k<1) as the value set by the user. On the other hand, where the dragging operation has been performed in a leftward direction from the starting-point display position 35, the MFP 1 acquires, as the finger-following-processing display position 37, a position distant from the starting-point display position 35 by a distance (k×x) obtained by multiplying a distance x from a starting-point display position of the slider 33 to an ending point of the dragging operation by the coefficient k as the value set by the user. That is, the MFP 1 acquires, as the finger-following-processing display position 37 of the slider 34, a position near the ending point of the dragging operation (i.e., a position located on a side of the ending point position 36 nearer to the starting-point display position 35). It is noted that the distance x can be obtained on the basis of the identification number (x, y) assigned to each detecting area.

Figure 3B:
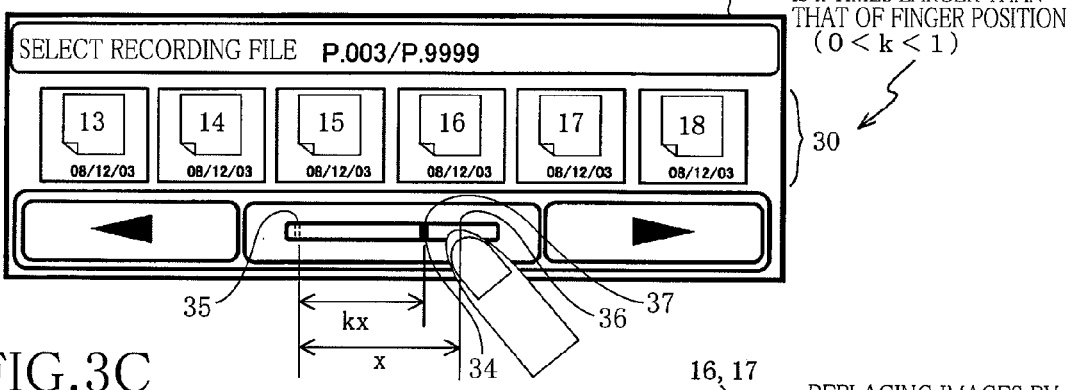

Then, as shown in FIG. 3B, the MFP 1 moves the display position of the slider 34 to the finger-following-processing display position 37 from the starting-point display position 35 of the slide bar 33 by the distance (k×x). Then, the MFP 1 obtains, as the second target display number, the display number of the image displayed in correspondence with the finger-following-processing display position 37 of the slider 34 after the movement thereof.

Figure 3C:
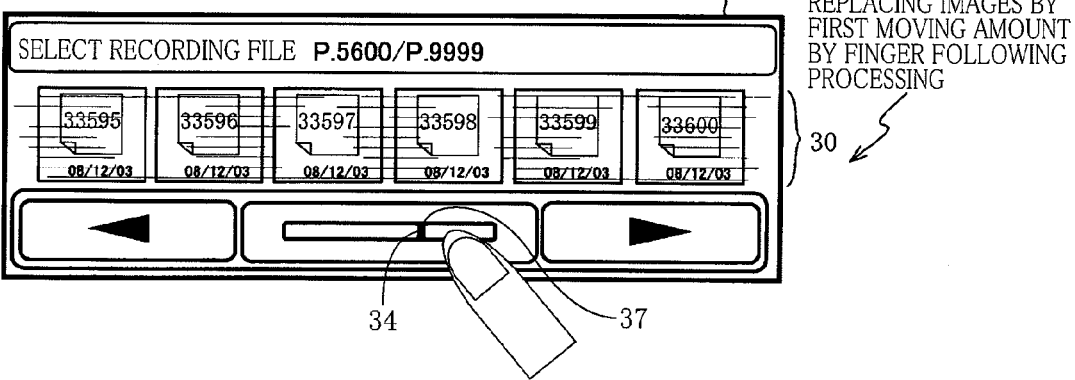

Then, as shown in FIG. 3C, the MFP 1 performs a finger following processing for replacing or changing displayed images from the starting point display number to the second target display number by the first moving amount in the display order. The first moving amount is a value representing the number of images to be displayed during the unit time (e.g., 0.6 seconds). Specifically, the first moving amount represents a difference between the display number of the images to be displayed at a start of the unit time and the display number of the images to be displayed at an end of the unit time. It is noted that the first moving amount is calculated on the basis of a difference between the second target display number and the starting point display number. Specifically, the first moving amount is calculated so as to increase as the difference between the second target display number and the starting point display number increases. Further, the calculation of the first moving amount is performed at predetermined time intervals even when the finger following processing is being performed and when the difference between the second target display number and the starting point display number is relatively large. In the present embodiment, the unit time is set as 0.6 seconds, and the first moving amount is set at thirty. In this case, where the images of the respective display numbers 1-6 are being displayed at 0.1 seconds as the start of the unit time, for example, the MFP 1 changes the images displayed on the image display area 30 at a speed in which images 31-36 are displayed at 0.6 seconds as the end of the end of the unit time. That is, the replacement of the images is performed such that a difference between (a) the display number (e.g., "1") of a leftmost one of the six images displayed at the start of the unit time and (b) the display number (e.g., "31") of a leftmost one of the six images displayed at the end of the unit time is thirty.

In this MFP 1, the CPU 10 regularly reads out the bitmap data stored in the VRAM 13 and displays the display image on the LCD 16 on the basis of the read bitmap data. Thus, in this MFP 1, the bitmap data stored in the VRAM 13 is updated at intervals of 0.1 seconds in order to replace the images by the first moving amount. For example, processings are performed at the intervals of 0.1 seconds, the processings including a processing for producing bitmap data corresponding to a display image including the images of the respective display numbers 1-6 in the image display area 30 and storing the produced bitmap data into the VRAM 13, a processing for producing bitmap data corresponding to a display image including images of respective display numbers 7-12 in the image display area 30 and storing the produced bitmap data into the VRAM 13, a processing for producing bitmap data corresponding to a display image including images of respective display numbers 13-18 in the image display area 30 and storing the produced bitmap data into the VRAM 13, a processing for producing bitmap data corresponding to a display image including images of respective display numbers 19-24 in the image display area 30 and storing the produced bitmap data into the VRAM 13, a processing for producing bitmap data corresponding to a display image including images of respective display numbers 25-30 in the image display area 30 and storing the produced bitmap data into the VRAM 13, and a processing for producing bitmap data corresponding to a display image including images of respective display numbers 31-36 in the image display area 30 and storing the produced bitmap data into the VRAM 13. It is noted that, in this example, the unit time is set at 0.6 seconds, and the interval between each two of the processings is set at 0.1 seconds for a simple expression of numeric values, but the unit time and the interval are not limited to these values. For example, the interval may be set at a time shorter than 0.1 seconds such as 0.016 seconds, and the unit time may be set at a time shorter than 0.6 seconds. Conversely, the interval may be set at a time longer than 0.1 seconds, and the unit time may be set at a time longer than 0.6 seconds.

Figure 3D:
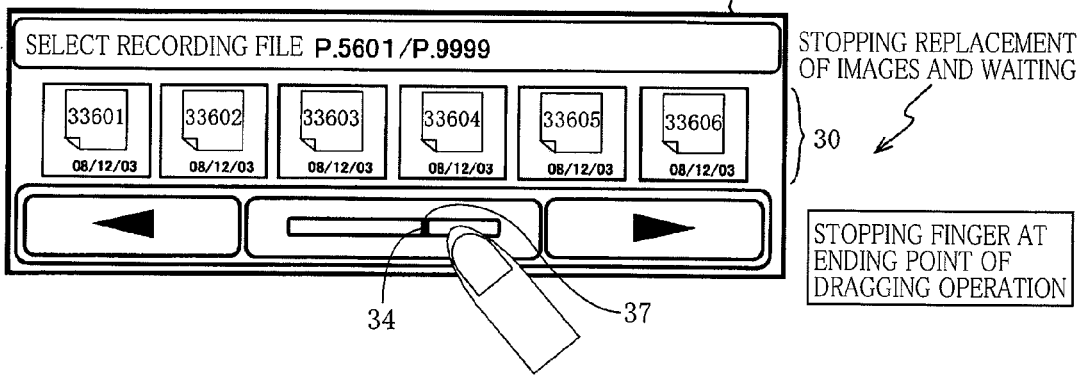

Then, as shown in FIG. 3D, where the user stops his or her finger in a state in which the finger is held in contact with the ending point of the dragging operation even after the images of the respective second target display numbers (images of respective display numbers "33601" to "33606" in FIG. 3D) have been displayed by the finger following processing, the MFP 1 does not replace the images and waits. Then, where one second has passed from the time when the ending point of the dragging operation becomes a contact state in which the user's finger contacts the touch panel 17, the MFP 1 performs the reducing processing.

There will be next explained an example of an operation method during the reducing processing with reference to FIGS. 4A to 4D. The reducing processing is a processing for displaying the display images on the image display area 30 by reducing the moving amount of the display images displayed on the image display area 30 to the second moving amount which is smaller than the first moving amount in the finger following processing. At a start of the reducing processing, the MFP 1 obtains, as a first target display number, the display number of the image corresponding to the ending point position 36 of the dragging operation. Further, the MFP 1 also obtains, as a calculation display number, the display number of the image being displayed at this time. Then, the MFP 1 calculates the second moving amount which is a value obtained by multiplying the first moving amount by a first coefficient as a first calculated value and the above-described moving-amount change rate (i.e., a second coefficient). The first coefficient is a value (a positive value smaller than one) which is obtained by dividing a difference between the first target display number and the calculation display number from a difference between the first target display number and the starting point display number. The calculated second moving amount inevitably becomes a value smaller than the first moving amount. That is, the replacement of the images is performed at a lower speed in the reducing processing than in the finger following processing. It is noted that, as long as the replacement of the images is performed at the lower speed in the reducing processing than in the finger following processing, there may be set, as the first coefficient, a value obtained by multiplying, dividing, adding, or subtracting a predetermined value by, from, to, or from the value obtained by dividing the difference between the first target display number and the calculation display number from the difference between the first target display number and the starting point display number.

Figure 4A:
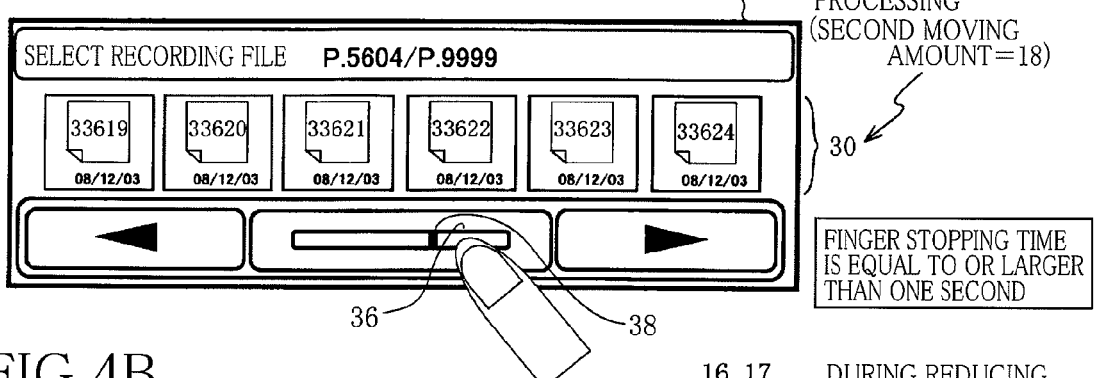
FIGS. 4A to 4D are schematic views for explaining an example of an operation method for a reducing processing.

As shown in FIG. 4A, when the reducing processing is started, the MFP 1 replaces the images displayed on the image display area 30 in the display order by the second moving amount of eighteen, for example. Since the above-described finger following processing is a processing in which the replacement of the images are performed by the first moving amount of thirty, there has been explained that the update of the VRAM 13 is performed at the intervals of 0.1 seconds, but the second moving amount is smaller than the first moving amount as described above, and thus intervals at which the VRAM 13 is updated in the case of the second moving amount are made longer than the intervals (e.g., 0.1 seconds) at which the VRAM 13 is updated in the case of the first moving amount.

Further, the MFP 1 displays the slider 34 at a position corresponding to a display number of an image to be displayed on the image display area 30. That is, with increase of the display number of the image to be displayed on the image display area 30, the position of the slider 34 is gradually moved closer to the position of the ending point of the dragging operation.

Figure 4B:
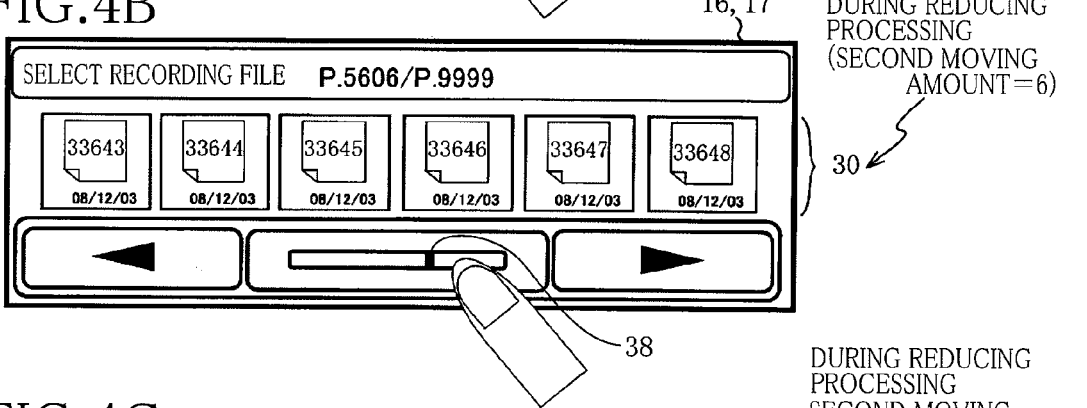

Further, the MFP 1 obtains, at predetermined time intervals, the display number of the image being displayed at this time as a new calculation display number, and recalculates the second moving amount. Since the display number of the image displayed on the image display area 30 approaches the first target display number at predetermined rate (that is, the first coefficient becomes smaller) as the time passes, as shown in FIG. 4B, the second moving amount is made gradually smaller (as indicated by dotted circle "UNDER REDUCING PROCESSING" in FIG. 5, for example) as the display number of the image displayed on the image display area 30 approaches the first target display number. Thus, as the display number of the image displayed on the image display area 30 approaches the first target display number, the user can visually recognize each image more carefully and easily select a desired file.

Figure 4C:
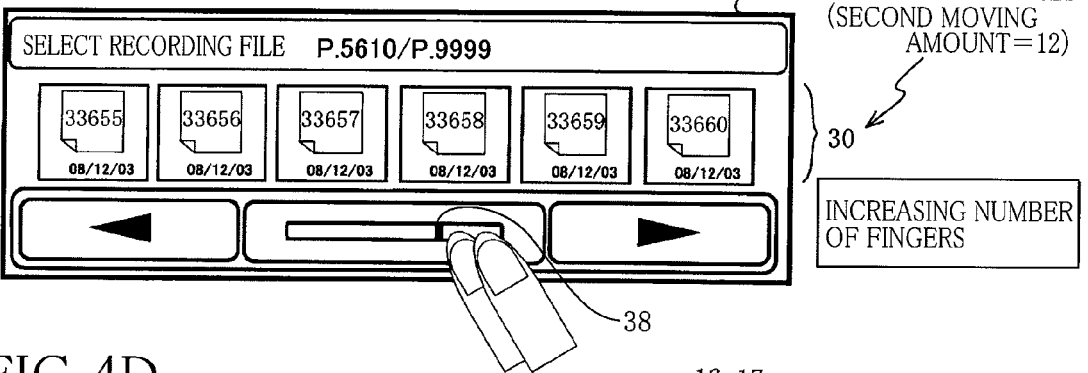

Further, as described above, the second moving amount is calculated by multiplying the first moving amount by the moving-amount change rate (i.e., the second coefficient). That is, as shown in FIG. 4C, the MFP 1 determines the second moving amount in accordance with the size of the touch area which is an area the user's finger has approached or touched. Consequently, a larger number of images can be displayed within a predetermined length of time by an intuitive operation of the user in which the touch area is increased by using a plurality of fingers, pressing the finger firmly onto the touch panel 17, or the like, than in the case where the touch area is small. On the other hand, the same image can be displayed for a longer time by an intuitive operation of the user in which the touch area is reduced by floating the finger on the slide bar 33 on purpose, or the like.

Figure 4D:
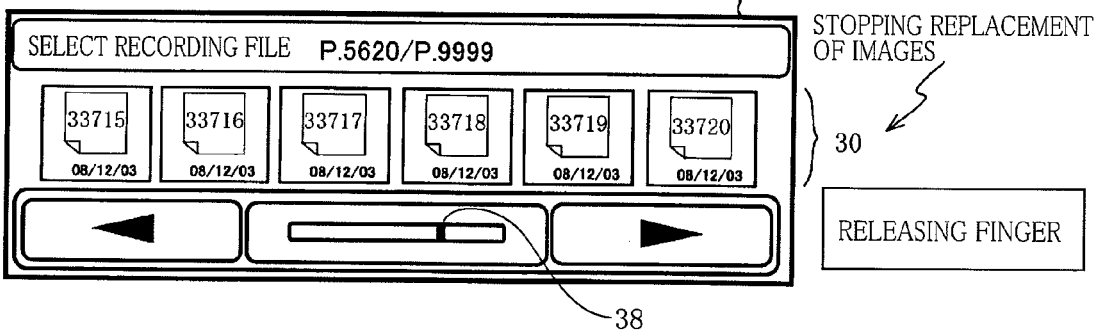

Further, as shown in FIG. 4D, when the user performs a predetermined reduction stopping operation during the reducing processing, the MFP 1 stops the reducing processing. In the present embodiment, the reduction stopping operation includes an operation in which the user releases the finger from the ending point of the dragging operation, an operation in which the user's finger touches an area other than the right scroll key 31, the left scroll key 32, and the slide bar 33, an operation in which the user slides the finger from the ending point of the dragging operation to the display position of the slider 34, and an operation in which the user presses, e.g., any of not-shown keys such as a back key and a return key.

Thus, where the user has found the desired image for a duration that the same images are displayed for a relatively long time from the second target display number to the first target display number by the reducing processing, the user can stop the replacement of the images by the simple operation such as the operation in which the user releases the finger from the ending point of the dragging operation, for example. Then, the user can select the desired file by the predetermined operation in a state in which the replacement is stopped.

Even where the number of all the files is large with respect to the number (e.g., six) of the images (i.e., the files) displayed in the slide display, for example, the user only needs to initially expect a position corresponding to a display number of a file to be selected and to perform the drag operation to the expected position. In the case where the user has performed this operation, the user visually recognizes images from the image of the starting point display number to the image of the second target display number, that is, to images near the image of the file the user wants to select, such that a relatively large number of the images are moved in a relatively short time from the stop of the dragging operation by the finger following processing. Further, the user visually recognizes images from the image of the second target display number to the image of the first target display number, that is, the images near the image (i.e., the file) the user wants to select, such that the images are moved in a relatively long time. That is, the user can find the image (i.e., the file) the user wants to select by carefully recognizing the images near the image the user wants to select, without wasting a long time to recognize the other images.

It is noted that, in FIGS. 3A-3D and 4A-4D, there has been explained that the initial operation of the user is the dragging operation in the rightward direction, and the replacement of the images is performed in a direction in which the display numbers of the respective images increase, but where the dragging operation is performed in a leftward direction, the replacement of the images is performed in a direction in which the display numbers of the respective images decrease.

Figure 5:
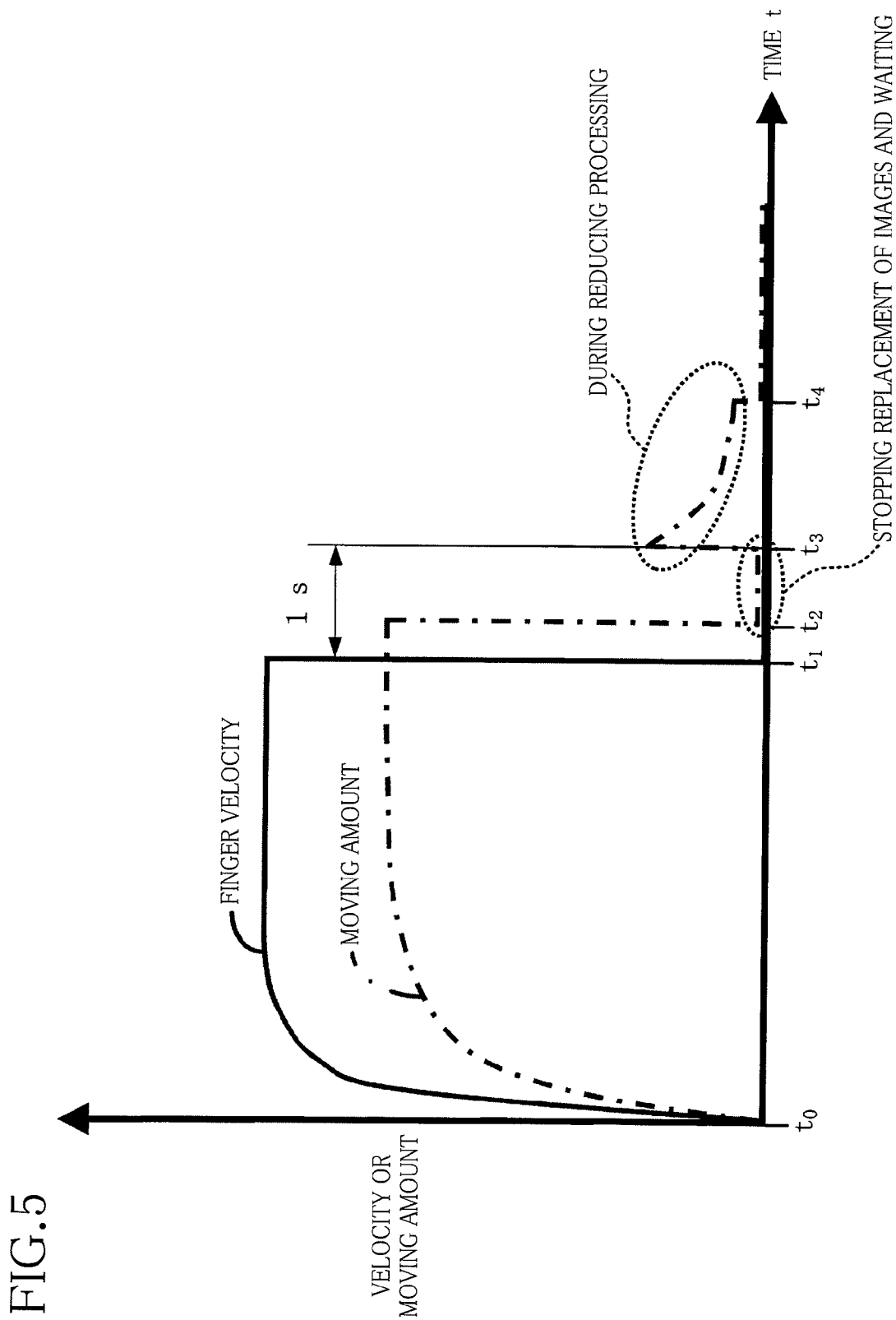
FIG. 5 is a graph showing an example of a relationship between a movement of a finger and a moving amount.

FIG. 5 is a graph showing an example of a relationship between a movement of the finger and the moving amount (i.e., the first moving amount and the second moving amount). In this graph, a lateral axis represents time t while a vertical axis represents a finger velocity v and the moving amount. It is noted that this finger velocity v represents an amount of change of a position of the finger in a lateral direction of the slide bar 33 per the unit time.

Initially, at time $t_0$, when the user has touched the slider 34 and then dragged his or her finger rightward or leftward, a position (k×x) of the slider 34 can be obtained on the basis of a position x at each point of the sliding movement of the slider 34. Then, the replacement of the images is performed by the finger following processing to the images of the respective display numbers corresponding to the position of the slider 34.

From the time $t_0$ to the time $t_2$, the MFP 1 calculates the first moving amount so as to follow the movement of the finger. At time $t_1$, when the user stops the movement of the finger, the ending point of the dragging operation is determined, and thus the display position of the slider 34 is changed to the position (k×x) corresponding to the position of the ending point. Then, the replacement of the images is performed by the first moving amount by the finger following processing until the images have reached the images of the second target display number corresponding to the changed display position of the slider 34. Then, at the time $t_2$, when the images displayed on the image display area 30 has reached the second target display number, the MFP 1 stops the replacement of the images and waits.

In the MFP 1 as the present embodiment, a condition for starting the reducing processing is that the user has stopped the movement of the finger for equal to or more than one second in a state in which the finger is held in contact with the ending point of the dragging operation. Here, it is assumed that, at the time $t_1$, the user stops the movement of the finger for equal to or more than one second after the finger has reached the ending point of the dragging operation.

Then, at time $t_3$, when equal to or more than one second has passed from the start of the contact state of the finger at the ending point of the dragging operation, the MFP 1 starts the reducing processing. In this reducing processing, the replacement of the images is performed by the second moving amount.

Then, at time $t_4$, when the user has performed the reduction stopping operation, the MFP 1 stops the replacement of the images.

Figure 6:
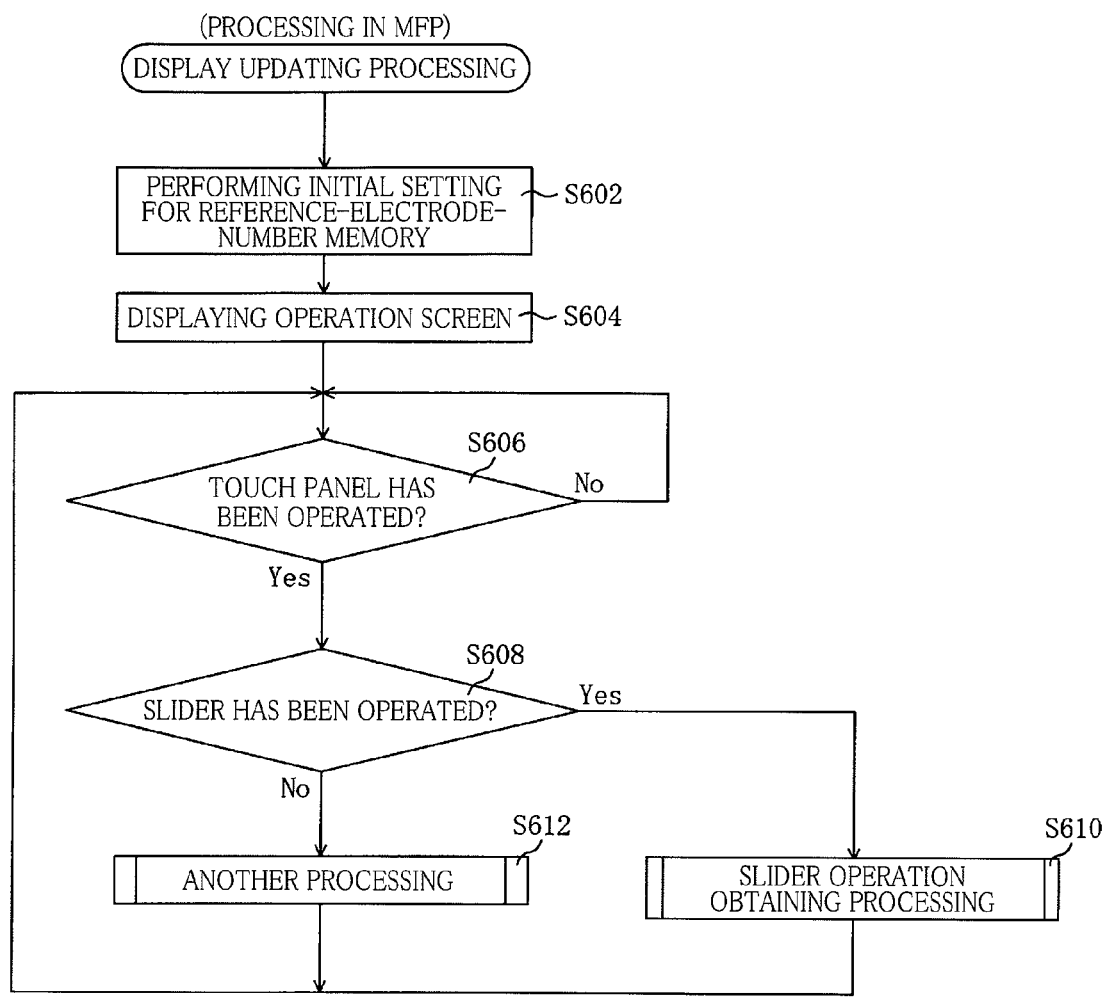
FIG. 6 is a flow-chart showing a display updating processing performed in the MFP.

There will be next explained the display updating processing (including the finger following processing and the reducing processing) performed in this MFP 1 with reference to FIG. 6. This display updating processing is a processing for performing the slide display in accordance with the inputting operation of the user, and is repeatedly performed from turning on a main power of the MFP 1 until the main power is turned off.

Initially in S602, the CPU 10 performs an initial setting for the reference-electrode-number memory 14a. Specifically, the CPU 10 causes the user to touch the touch panel 17 with his or her single finger, then specifies the electrode(s) the finger is touching on the touch panel 17, and finally sets a value based on the total number of the specified electrode(s) as the reference electrode number into the reference-electrode-number memory 14a.

Then, in S604, the CPU 10 displays the operation screen shown in FIG. 1B on the LCD 16. Then, in S606, the CPU 10 judges whether the user has operated the touch panel 17 or not. Where the CPU 10 has judged that the user has not operated the touch panel 17 (S606: No), the CPU 10 waits for the operation of the user.

On the other hand, where the CPU 10 has judged that the user has operated the touch panel 17 (S606: Yes), the CPU 10 judges in S608 whether the user has operated the slider 34 or not, that is, where the finger is held in contact with the detecting area(s) on the touch panel 17 (i.e., the contact state), the CPU 10 detects the touch area and judges whether the touch area is the display position of the slider 34 or not.

Where the CPU 10 has judged that the user has operated the slider 34 (S608: Yes), the CPU 10 performs in S610 the slider operation obtaining processing in which the images displayed on the image display area 30 are replaced in accordance with the operation of the slider 34 by the user, and this display updating processing returns to S606. On the other hand, where the CPU 10 has judged that the user has not operated the slider 34 (S608: No), the CPU 10 performs in S612 another processing in accordance with an operation by the user other than the operation for the slider 34, and this display updating processing returns to S606. For example, where the left scroll key 32 has been operated, the CPU 10 performs in S612 a processing in which the images displayed on the image display area 30 are replaced with images of the previous page.

Figure 7:
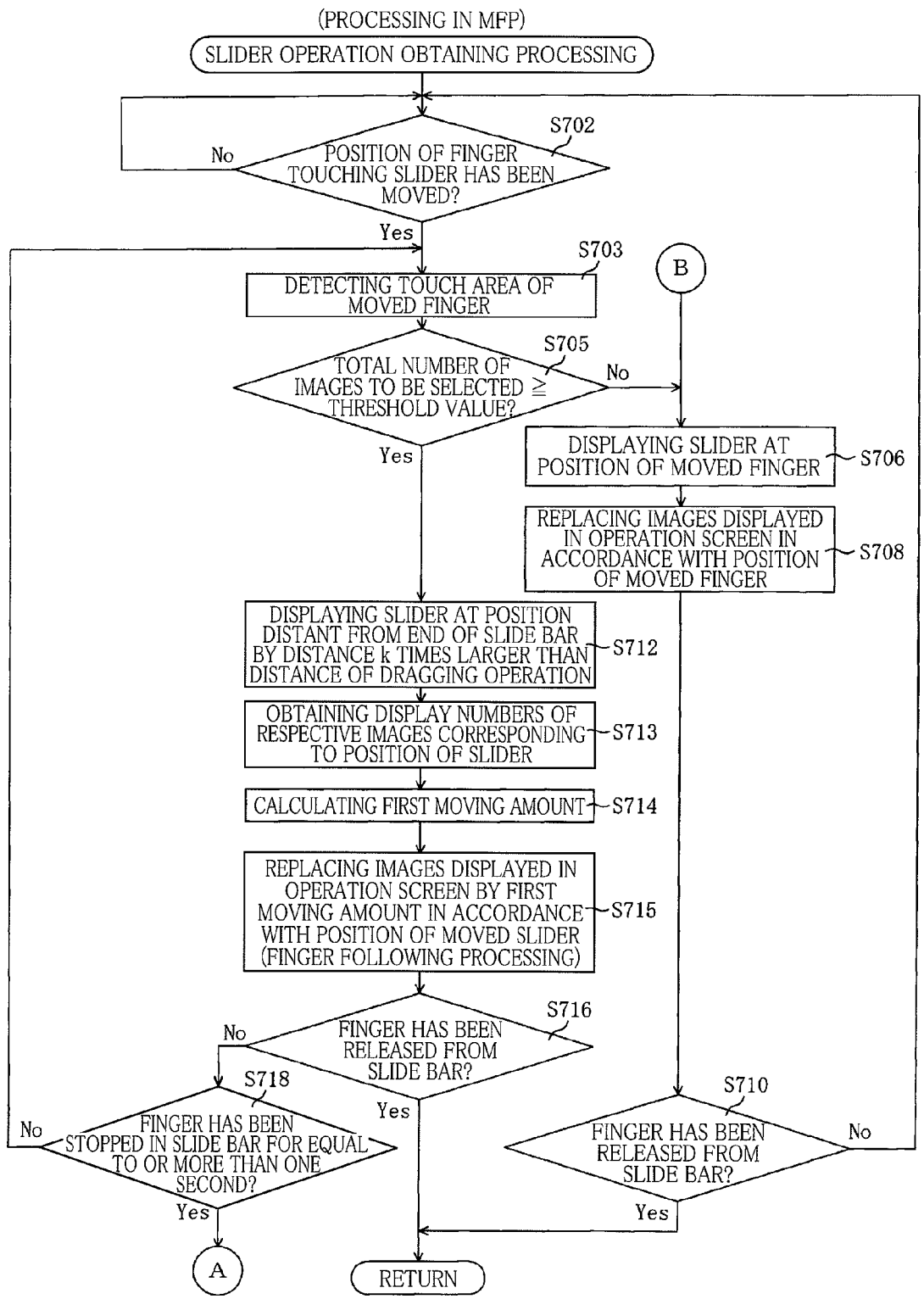
FIG. 7 is a part of a flow-chart showing a slider operation obtaining processing performed in the MFP.
Figure 8:
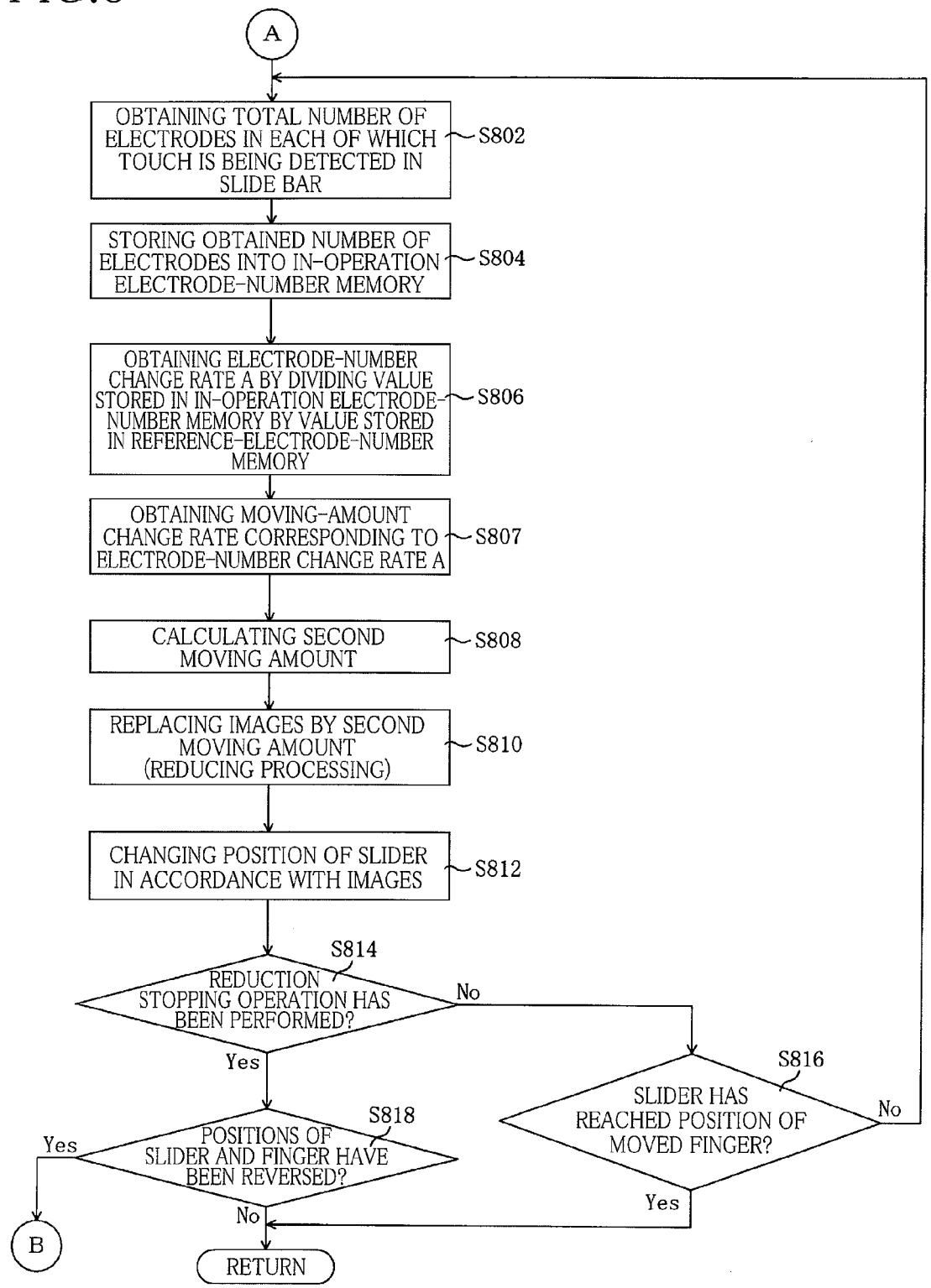
FIG. 8 is a part of the flow-chart showing the slider operation obtaining processing performed in the MFP.

There will be next explained the slider operation obtaining processing (S610) with reference to FIGS. 7 and 8. This slider operation obtaining processing (S610) is the processing in which the images displayed on the image display area 30 are replaced in accordance with the operation of the slider 34 by the user.

Initially in S702, the CPU 10 judges whether the position of the finger touching the slider 34 has been moved or not, that is, the CPU 10 judges whether the dragging operation has been performed or not. Where the CPU 10 has judged that the dragging operation has not been performed (S702: No), the CPU 10 waits for the operation.

On the other hand, where the CPU 10 has judged that the dragging operation has been performed (S702: Yes), the CPU 10 detects in S703 a touch area of the finger after the movement. That is, where the contact state of the finger with the touch panel 17 continues, the CPU 10 detects the touch area which is an area the finger touches on the touch panel 17.

Then, in S705, the CPU 10 judges whether the number of the files (that is, the number of the images to be displayed on the LCD 16) is equal to or more than a threshold value or not. It is noted that this threshold value is a value set by the user and stored in advance in the flash memory 14. In the present embodiment, a positive decision by the CPU 10 in the judgment of S705 is a condition that the reducing processing is started. In this setting, where the number of the files to be displayed is not a large number, the reducing processing is not performed, whereby the user can view an image based on a user-desired file more speedily. Further, where the number of the files is so large that it is difficult for the user to view all the files, the user can easily select a desired file. It is noted that the judgment of S705 only requires a judgment about whether or not the number of the files is large to such an extent that it is difficult for the user to select a desired file from all the files. For example, this MFP 1 may be configured such that the number of the page numbers required for the display of the images based on all the files on the image display area 30 in the display order is equal to or larger than a threshold value or not.

In the case where the CPU 10 has judged that the number of the files is equal to or more than the threshold value (S705: Yes), the CPU 10 displays in S712 the slider 34 at the position distant from the starting-point display position 35 of the slide bar 33 by the distance x extending from the starting-point display position 35 to a current touch area. Where the dragging operation has been performed in the leftward direction, the CPU 10 displays in S712 the slider 34 at the position distant from the starting-point display position 35 by the distance (k×x), which is k times larger than the distance x, extending from the starting-point display position 35 to the current touch area. Then, in S713, the CPU 10 obtains the display number of the image corresponding to the position of the slider 34. That is, where it is assumed that the display number corresponding to the touch area detected in S703 are the first target display number, the CPU 10 obtains, as the second target display number, display number between the first target display number and the display number (i.e., the starting point display number) of the image displayed before the finger has touched the touch panel 17. Then, in S714, the CPU 10 calculates the first moving amount. It is noted that the first moving amount may be calculated as explained with reference to FIG. 3C, but a fixed value may be used as the first moving amount.

Then, in S715, the CPU 10 performs the finger following processing in which images to be displayed on the image display area 30 are changed by the first moving amount, the images reaching or being up to the image of the display number corresponding to the position of the moved slider 34. Specifically, as described above, the CPU 10 updates the bitmap data stored in the VRAM 13 at the time intervals determined on the basis of the first moving amount. Then, in S716, the CPU 10 judges whether the user has released the finger from the slide bar 33 or not. Where the CPU 10 has judged that the user has released the finger from the slide bar 33 (S716: Yes), the CPU 10 completes the slider operation obtaining processing in S610, and the processing returns to the processing of S606 shown in FIG. 6.

On the other hand, where the CPU 10 has judged that the user has not released the finger from the slide bar 33 (S716: No), the CPU 10 judges in S718 whether the finger has been stopped in the slide bar 33 for equal to or more than one second, that is, the CPU 10 judges whether the operation in which the finger is stopped has been continued at the ending point of the dragging operation for equal to or more than one second or not. Where the CPU 10 has judged that the finger has not been stopped in the slide bar 33 for equal to or more than one second (S718: No), this slider operation obtaining processing returns to S703. It is noted that the position of the slider 34 displayed in S712 is not changed during a period until a length of time from the stop of the finger at the ending point of the dragging operation has passed one second. Then, in S715, the CPU 10 performs the replacement of the images by the finger following processing until the image has reached the image of the second target display number. It is noted that, though not shown in this flow-chart, when the image displayed on the image display area 30 has reached the image of the second target display number, the CPU 10 stops the replacement of the images by skipping the processing of S715.

On the other hand, where the CPU 10 has judged that the finger has been stopped in the slide bar 33 for equal to or more than one second (S718: Yes), that is, where, the finger has touched the area on which the slider 34 has been displayed, then the dragging operation has been performed in which an area of the slide bar 33 different from the area on which the slider 34 has been displayed becomes the contact state, and then the predetermined length of time (e.g., one second) has passed from the time when the ending point of the dragging operation becomes the contact state, this slider operation obtaining processing goes to S802 shown in FIG. 8, and the CPU 10 performs the reducing processing. Thus, the user can operate the MFP 1 to perform the reducing processing by the simple operation in which the user stops the finger at the ending point of the dragging operation for equal to or more than the predetermined length of time, thereby easily operating the MFP 1.

On the other hand, where the CPU 10 has judged that the number of the files the user can select is not equal to or more than the threshold value (S705: No), the CPU 10 displays in S706 the slider 34 at the position of the moved finger. Then, in S708, the CPU 10 replaces the images to be displayed on the image display area 30 in the display order until the image has reached the image of the display number corresponding to the position of the moved finger. It is noted that a speed of the replacement of the images in S708 may be any speed. For example, the first moving amount may be used as the speed as in the finger following processing.

Then, in S710, the CPU 10 judges whether the user has released the finger from the slide bar 33 or not. Where the CPU 10 has judged that the user has not released the finger from the slide bar 33 (S710: No), this slider operation obtaining processing returns to S702. On the other hand, where the CPU 10 has judged that the user has released the finger from the slide bar 33 (S710: Yes), the CPU 10 completes this slider operation obtaining processing, and the processing returns to the processing of S606 shown in FIG. 6.

There will be explained, with reference to FIG. 8, processings from S802 of the slider operation obtaining processing. In the flow-chart in FIG. 8, the CPU 10 performs the reducing processing.

In S802, the CPU 10 obtains the total number of the electrode(s) in each of which the touch of the finger is being detected in the slide bar 33. The total number of the electrode(s) represents the size of the touch area which is the area the user's finger has approached or touched. Then, in S804, the CPU 10 stores the obtained number of the electrode(s) as the in-operation electrode number into the in-operation electrode-number memory 12a. Then, in S806, the CPU 10 obtains, as the electrode-number change rate A, the value calculated by dividing the value stored in the in-operation electrode-number memory 12*a* by the value stored in the reference-electrode-number memory 14*a*.

Then, in S807, the CPU 10 refers the moving-amount selecting table and obtains the moving-amount change rate (i.e., the second coefficient) corresponding to the electrode-number change rate A. Then, in S808, as explained with reference to FIG. 4, the CPU 10 calculates the second moving amount by multiplying the first moving amount by the first coefficient and the second coefficient. It is noted that this MFP 1 may be configured such that an initial value of the second moving amount is set at a fixed value, and the CPU 10 calculates the second moving amount at each point in the reducing processing. In this configuration, the CPU 10 may calculate, as a distance x1, a distance between the slider 34 and the position of the finger (i.e., the ending point of the dragging operation), and calculate the second moving amount by multiplying the initial value of the second moving amount by the moving-amount change rate and a coefficient based on the calculated distance x1. In this case, the second moving amount can be determined in accordance with the distance x1 and the touch area of the finger.

Then, in S810, the CPU 10 performs the reducing processing in which the images displayed on the image display area 30 are replaced by the second moving amount, the images ranging from the image based on the file of the second target display number to the image based on the file of the first target display number. Specifically, as described above, the CPU 10 updates the bitmap data stored in the VRAM 13 at the time intervals determined on the basis of the second moving amount.

Then, in S812, the CPU 10 changes the position of the slider 34 in accordance with the display number of the image to be displayed. It is noted that, in S812, the position of the slider 34 is calculated as a reducing-processing display position 38, and the slider 34 is displayed at the reducing-processing display position 38 on the slide bar 33.

Then, in S814, the CPU 10 judges whether the above-described reduction stopping operation has been performed or not. Where the CPU 10 has judged that the reduction stopping operation has been performed (S814: Yes), the CPU 10 judges in S818 whether the positions of the slider 34 and the finger have been reversed or not. That is, where the user has moved the finger from the ending point of the dragging operation corresponding to the image of the first target display number in a direction opposite to a direction in which this dragging operation has been performed, and then has moved the finger to pass through the display position of the slider 34, the processing of S818 is judged to be positive. Where the CPU 10 has judged that the positions of the slider 34 and the finger have been reversed (S818: Yes), this slider operation obtaining processing returns to S706 shown in FIG. 7. That is, the CPU 10 performs the normal slide display in which the images displayed on the image display area 30 are replaced in the display order until the displayed images are replaced with the images of the respective display numbers corresponding to the area the finger has touched.

On the other hand, where the CPU 10 has judged that the positions of the slider 34 and the finger have not been reversed (S818: No), that is, where the user has performed, as the reduction stopping operation, the operation in which the user has released the finger from the ending point of the dragging operation or the operation in which the finger has touched the area other than the right scroll key 31, the left scroll key 32, and the slide bar 33, the processing returns to the processing of S606 shown in FIG. 6. As a result, the reducing processing is stopped. Where the reducing processing is stopped, the CPU 10 continues to display the images displayed on the image display area 30 when the user has released the finger from the ending point of the dragging operation. Thus, the user can stop the reducing processing at the desired images of the respective display numbers by performing the simple reduction stopping operation at the time when the user has found the desired file, thereby easily operating the MFP 1.

On the other hand, where the CPU 10 has judged that the reduction stopping operation has not been performed (S814: No), the CPU 10 judges in S816 whether the slider 34 has reached the position of the moved finger (i.e., the ending point of the dragging operation). Where the CPU 10 has judged that the slider 34 has not reached the position of the moved finger (S816: No), this slider operation obtaining processing returns to S802. On the other hand, where the CPU 10 has judged that the slider 34 has reached the position of the moved finger (S816: Yes), the processing returns to the processing of S606 shown in FIG. 6. As a result, the reducing processing is stopped in a state in which the image of the first target display number is displayed on the LCD 16.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

For example, in the above-described embodiment, where the user has touched the slider 34 with the finger and then dragged the finger (that is, the dragging operation has been performed), the CPU 10 determines the second target display number on the basis of the ending point of this dragging operation and performs the reducing processing. However, a concrete operation of the user for causing the MFP 1 to perform the reducing processing is not limited to this operation. For example, the MFP 1 may be configured such that, in each of the cases where the user's finger has touched an area of the slide bar 33 different from the slider 34, where the user has touched or pressed a second detecting area or a button located on an outside of the slide bar 33 while continuing the touch of the finger, where a length of time that the finger is stopped at the position becomes equal to or more than a predetermined time, and where the user has released the finger from the position and touched the same position immediately after the release (that is, the user has double-clicked the position), the CPU 10 sets the display number corresponding to the touch position as the first target display number and sets a distance from the starting-point display position 35 of the slide bar 33 to the touch position as the distance x, and then, similarly to the above-described explanation with reference to FIG. 3C, the CPU 10 obtains, as the second target display number, the display number between the first target display number and the starting point display number and performs the reducing processing.

Further, in the above-described embodiment, the MFP 1 uses the touch panel 17 configured to detect the touch of the user's finger, but may use a touch panel configured to detect an approach of the user's finger. Specifically, the MFP 1 may use a touch panel of a projected electrostatic capacitance type which uses a change of an electrostatic capacitance between the finger and the touch panel by an electrostatic bond between the finger and the touch panel which is caused when a fingertip has approached or touched the touch panel. Further, the MFP 1 may use a touch panel of a type in which the approach or the touch of the finger is detected by infrared radiation and/or an electric field.

Further, in the above-described embodiment, there has been explained that the images are displayed so as to be arranged or aligned in ascending order of the display numbers, but the images may be displayed so as to be arranged or aligned in descending order of the display numbers.

Further, in the above-described embodiment, the images are displayed in the display order such that the difference between the display number of the image displayed at the start of the unit time and the display number of the image displayed at the end of the unit time is the first moving amount (or the second moving amount). Specifically, the MFP 1 may be designed in the following configuration, for example. Where six images are displayed on one display screen, and the unit time and the first moving amount are respectively set at 0.6 seconds and twenty-four, the CPU 10 executes a processing in which images of respective display numbers 1-12 are set as to-be-displayed images, and then the CPU 10 produces bitmap data corresponding to the images of the respective display numbers 1-6 as first half of the to-be-displayed images and stores the produced bitmap data into the VRAM 13. Then, the CPU 10 executes a processing in which images of respective display numbers 13-24 are set as to-be-displayed images, and then the CPU 10 produces bitmap data corresponding to the images of the respective display numbers 13-18 as first half of the to-be-displayed images and stores the produced bitmap data into the VRAM 13. Then, the CPU 10 executes a processing in which images of respective display numbers 25-36 are set as to-be-displayed images, and then the CPU 10 produces bitmap data corresponding to the images of the respective display numbers 25-30 as first half of the to-be-displayed images and stores the produced bitmap data into the VRAM 13, and the CPU 10 updates the VRAM 13 at time intervals of 0.2 seconds. In this configuration, the difference between each of the display numbers (e.g., 1-6) of the respective images displayed at the start of the unit time and a corresponding one of the display numbers (e.g., 25-30) of the respective images displayed at the end of the unit time is twenty-four. It is noted that this difference can be obtained as a difference between the smallest value of the display number of the image displayed at the start of the unit time and the smallest value of the display number of the image displayed at the end of the unit time or as a difference between the largest value of the display number of the image displayed at the start of the unit time and the largest value of the display number of the image displayed at the end of the unit time, for example.

As in this specific example, the display control of the CPU 10 may be a control in which there are images not displayed on the LCD 16 among the to-be-displayed images. In other words, the CPU 10 may regard the images not displayed on the LCD 16 as the to-be-displayed images. That is, the MFP 1 may be configured such that the images between the image displayed at the start of the unit time and the image displayed at the end of the unit time are not displayed.

Further, the second moving amount is set at an amount smaller than the first moving amount as in the above-described explanation. In this case, the MFP 1 may be designed in the following configuration, for example. The CPU 10 executes a processing in which images of respective display numbers 1-9 are set as to-be-displayed images, and then the CPU 10 produces bitmap data corresponding to the images of the respective display numbers 1-6 as first parts of the to-be-displayed images and stores the produced bitmap data into the VRAM 13. Then, the CPU 10 executes a processing in which images of respective display numbers 10-18 are set as to-be-displayed images, and then the CPU 10 produces bitmap data corresponding to the images of the respective display numbers 10-15 as first parts of the to-be-displayed images and stores the produced bitmap data into the VRAM 13. Then, the CPU 10 executes a processing in which images of respective display numbers 19-27 are set as to-be-displayed images, and then the CPU 10 produces bitmap data corresponding to the images of the respective display numbers 19-24 as first parts of the to-be-displayed images and stores the produced bitmap data into the VRAM 13, whereby the CPU 10 updates the VRAM 13 at the time intervals of 0.2 seconds. In this configuration, the difference between the display number (e.g., 1-6) of the images displayed at the start of the unit time (i.e., 0.6 seconds) and the display number (e.g., 19-24) of the images displayed at the end of the unit time is eighteen. That is, the CPU 10 may perform the display control such that the second moving amount is smaller than the first moving amount by reducing the number of the images not to be displayed among the to-be-displayed images. Further, the CPU 10 may perform the control such that the second moving amount is smaller than the first moving amount by lengthening the time intervals of the update of the VRAM 13.

Further, the MFP 1 may be configured such that the CPU 10 accesses a start address of a memory in which is developed three pages' bitmap data, i.e., bitmap data corresponding to eighteen images where six images are displayed at a time, and then the CPU 10 displays images indicated by one page's bitmap data from the accessed address and repeatedly changes an address to be accessed by predetermined lines, thereby scrolling the display screen. In this configuration, where the CPU 10 executes a processing for displaying images in a setting in which the unit time and the first moving amount are respectively set at 0.6 seconds and thirty, the CPU 10 performs this processing in the following procedure, for example. Initially, the CPU 10 produces three pages' bitmap data on the basis of images of respective display numbers 1-6, 7-12, and 13-18 and stores the produced bitmap data into the memory. Then, the CPU 10 accesses the start address of the memory, then displays the display screen, and continues to display the display screen while repeatedly changing the address to be accessed to a later address. Then, after the CPU 10 has displayed images based on the three pages' bitmap data stored in the memory at 0.3 seconds, the CPU 10 produces one page's bitmap data based on images of respective display numbers 19-24 and stores the produced bitmap data into the memory from the start address. That is, the CPU 10 overwrites an area in which the bitmap data based on the images of the respective display numbers 1-6 has been stored, with the bitmap data based on images of respective display numbers 19-24. Where another 0.1 seconds has passed, the CPU 10 produces one page's bitmap data based on images of respective display numbers 25-30 and stores the produced bitmap data into the memory from an address later than the start address by a memory size of one page's bitmap data. Further, where another 0.1 seconds has passed, the CPU 10 produces one page's bitmap data based on images of respective display numbers 31-36 and stores the produced bitmap data into the memory from an address later than the start address by a memory size of two page's bitmap data. As thus described, the MFP 1 may be configured such that the MFP 1 includes a memory for storing images in a plurality of pages, and the CPU 10 stores one page's bitmap data into the memory while repeatedly changing or shifting an address of the memory at the intervals of 0.1 seconds. In this configuration, the difference between the display number (e.g., 1-6) of the image displayed at the start of the unit time (i.e., 0.6 seconds) and the display number (e.g., 31-36) of the image displayed at the end of the unit time is thirty.

Further, in order to perform the display control using the second moving amount smaller than the first moving amount, the CPU 10 may perform, in the control using the second moving amount, the processing for storing the one page's bitmap data at the intervals of 0.2 seconds while the CPU 10 performs, in the control using the first moving amount, the processing for storing the one page's bitmap data at the intervals of 0.1 seconds.

Further, in the above-described embodiment, the CPU 10 displays the to-be-displayed images in the display order such that the difference between the display number of the image displayed at the start of the unit time and the display number of the image displayed at the end of the unit time is the first moving amount (or the second moving amount), with the images from the starting point display number to the second target display number being as the to-be-displayed images. Specifically, the MFP 1 may be configured such that the CPU 10 may perform the display control such that a screen on which a plurality of images including the image of the starting point display number are displayed in the display order is changed to a screen on which a plurality of images including the image of the second target display number are displayed in the display order, for example. That is, the MFP 1 may be configured such that there is any image to be not displayed among images of respective display numbers between the starting point display number and the second target display number. In this configuration, the plurality of images including the image of the starting point display number correspond to the images displayed at the start of the unit time, and the plurality of images including the image of the second target display number correspond to the images displayed at the end of the unit time.

Further, in the above-described embodiment, images based on files are displayed on the LCD 16, but any information may be displayed on the LCD 16 as long as the display number is assigned to the information. For example, character strings may be displayed on the LCD 16 instead of images. In this configuration, the MFP 1 may be configured such that an area for displaying a plurality of display informations each constituted by a character string is provided instead of the image display area 30, and the display informations are displayed in the display order on the basis of the operation of the user.

It is noted that, in the above-described embodiment, the MFP 1 is configured not to replace the images and wait until the time $t_3$ when the images displayed on the image display area 30 have reached the images of the second target display number at the time $t_2$ by the finger following processing, but the present invention is not limited to this configuration. For example, the MFP 1 may be configured to perform the reducing processing immediately after the images displayed on the image display area 30 have reached the images of the second target display number at the time $t_2$ by the finger following processing, that is, the MFP 1 may perform the reducing processing without waiting until the time $t_3$. In this configuration, the user can speedily display images of respective desired display numbers on the image display area 30, thereby making it possible to easily find a desired image.

Further, in the above-described embodiment, the MFP 1 is configured not to change the position of the slider 34 after displaying the slider 34 at the finger-following-processing display position 37 in the finger following processing, but the present invention is not limited to this configuration. For example, the MFP 1 may be configured to display the slider 34 at a position on the slide bar 33 which corresponds to the display numbers of the respective images displayed on the image display area 30 in the finger following processing, and gradually move the slider 34 to the finger-following-processing display position 37. In this configuration, the user can visually recognize the display numbers of the respective images being displayed on the image display area 30.

Further, in the above-described embodiment, the MFP 1 is configured to calculate the first moving amount on the basis of the difference between the second target display number and the starting point display number in the finger following processing, but the present invention is not limited to this configuration. For example, the first moving amount in the finger following processing may be a value which becomes smaller in accordance that the display number of the image to be displayed on the image display area 30 become closer to the second target display number. In this configuration, the user can recognize the images to be displayed on the image display area 30 also in a later part of the finger following processing, and the moving amount in the finger following processing and the moving amount in the reducing processing can be set at respective values near to each other where the reducing processing is performed subsequently to the finger following processing, thereby making it possible to smoothly reduce a speed of the movement of the images displayed on the image display area 30.

In view of the above, the CPU 10 can be considered to include a detecting section configured to detect an approach-touch area of the detecting areas where the detecting areas are in an approach-touch state in which the finger has touched the detecting areas, the approach-touch area being an area the finger has approached or touched, and this detecting section can be configured to perform the processing of S703. Further, the CPU 10 can be considered to include an obtaining section configured to obtain the second target display number between the first target display number and the starting point display number, this obtaining section can be configured to perform the processing of S713.

Further, the CPU 10 can be considered to include a display controller configured to perform a first display processing in which the display controller controls the LCD 16 such that at least part of the display informations whose respective display numbers range from the starting point display number to the second target display number are displayed as to-be-displayed informations in the display order such that the difference between the display number of the to-be-displayed informations displayed at the start of the unit time and the display number of the to-be-displayed informations displayed at the end of the unit time is the first moving amount, and configured to perform, after the display information corresponding to the second target display number has become one of the to-be-displayed informations in the first display processing, a second display processing in which the display controller controls the LCD 16 such that at least part of the display informations whose respective display numbers range from the second target display number to the first target display number are displayed as the to-be-displayed informations in the display order such that the difference between the display number of the to-be-displayed informations displayed at the start of the unit time and the display number of the to-be-displayed informations displayed at the end of the unit time is the second moving amount, and the first display processing and the second display processing can be considered to respectively correspond to the processings of S715 and S810.

Further, this display controller can be considered to perform a slider display processing in which the display controller controls the LCD 16 such that the slider 34 is displayed at a position corresponding to the respective display numbers of the display informations, and this slider display processing can be considered to correspond to the processing of S712. Further, this display controller can be considered to display, as the processing of S715, the display informations from the starting point display number to the second target display number by performing the first display processing. Further, this display controller can be considered to include a reducing section configured to gradually reduce the second moving amount at a predetermined rate in the second display processing, and this reducing section can be considered to perform the processing of S808.

What is claimed is:

1. A display apparatus comprising:
a display device that displays a plurality of display information to which a plurality of display numbers are respectively assigned based on a display order in which the plurality of display information is displayed on a display screen;
a slide-bar portion of the display device in which the display device displays a slide bar whose entire length indicates a total number of all the display information,
wherein respective display numbers of the plurality of display information are assigned to respective detecting areas of the slide bar,
wherein the slide bar is divided from one end thereof to an opposite end thereof into the respective detecting areas along a lengthwise direction thereof,
wherein the display device displays a slider on the slide bar such that a position of the slider on the slide bar corresponds to the display number of one of the plurality of display information that is being displayed on the display screen, and
wherein each of the detecting areas detects an approach or a touch of an input object; and
one or more processors that:
detect whether a position change of the input object in the slide bar from a starting position to an ending position occurs during the approach or the touch of the input object, the starting position being the position of the slider displayed on the slide bar before the position change occurs, and the starting position corresponding to a starting point display number of the display information displayed on the display screen before the position change occurs;
obtain a first target display number, which corresponds to the ending position, and a second target display number, which corresponds to an intermediate position on the slide bar,
wherein the intermediate position is between the starting position and the ending position in the lengthwise direction of the slide bar; and
control the display device,
wherein, when the one or more processors detect the position change of the input object from the starting position to the ending position, the one or more processors perform a first display processing in which the display device displays the plurality of display information in the display order from display information to which the starting point display number is assigned to display information to which the second target display number is assigned such that a display number of one of the plurality of display information displayed on the display screen is changed in a unit time by a first display-number-difference value, which is a difference between a display number of display information displayed at a start of the unit time and a display number of display information displayed at an end of the unit time, and
wherein the one or more controllers perform, after the first display processing and while the position of the input object is maintained at the ending position in a state in which the input object is held in contact with the slide bar, a second display processing in which the display device displays the plurality of display information in the display order from the display information to which the second target display number is assigned to display information to which the first target display number is assigned, such that the display number of the one of the plurality of display information displayed on the display screen is changed in the unit time by a second display-number-difference value which is less than the first display-number-difference value.

2. The display apparatus according to claim 1,
wherein the one or more processors control the display device to display the display information to which the display number is assigned from the starting point display number to the second target display number after displaying the slider at the intermediate position corresponding to the second target display number by performing the first display processing.

3. The display apparatus according to claim 1,
wherein the one or more controllers determine the first display-number-difference value in the first display processing based on a difference between the second target display number and the starting point display number.

4. The display apparatus according to claim 3,
wherein the one or more processors make the first display-number-difference value larger in the first display processing in a situation in which the difference between the second target display number and the starting point display number is large than in a situation in which the difference between the second target display number and the starting point display number is small.

5. The display apparatus according to claim 1,
wherein the one or more processors determine the second display-number-difference value in the second display processing based on a difference between the first target display number and a calculation display number of the display information being displayed on the display device when the one or more processors determine the second display-number-difference value in the second display processing.

6. The display apparatus according to claim 1,
wherein the one or more processors gradually reduce the second display-number-difference value in the second display processing.

7. The display apparatus according to claim 6,
wherein the one or more processors gradually reduce the second display-number-difference value based on a first calculation value obtained by dividing a difference between the first target display number and a calculation display number of the display information, which is displayed on the display device when the one or more processors determine the second display-number-difference value in the second display processing, by a difference between the first target display number and the starting point display number.

8. The display apparatus according to claim 1, wherein the one or more processors further obtain a value representing a number of the detecting areas detecting the approach or touch of the input object,
wherein the one or more processors determine the second display-number-difference value in the second display processing based on a value obtained by the one or more processors.

9. The display apparatus according to claim 1,
wherein the one or more processors continue controlling the display device to display the display information on the display screen at a time when the input object has discontinued approaching or touching the detecting areas or at a time when the input object has approached or touched an area different from the detecting areas and either the input object has discontinued approaching or touching in the second display processing or the input object has approached or touched the area different from the approach-touch area in the second display processing.

10. The display apparatus according to claim 1,
wherein the one or more controllers wait to perform the second display processing until a predetermined length of time has passed from a time when the position change of the input object from the starting position to the ending position was detected by the one or more processors.

11. The display apparatus according to claim 10,
wherein the one or more processors perform the second display processing when at least a portion of the detecting areas has detected the approach or the touch of the input object for the predetermined length of time.

12. The display apparatus according to claim 1,
wherein the one or more processors perform the first processing and the second display processing when the number of the plurality of display information which are to be displayed on the display device is larger than a predetermined number, and
wherein, when the number of the plurality of display information which are to be displayed on the display device is less than or equal to the predetermined number, the one or more processors perform processes comprising:
controlling the display device to display the slider at the position of the input object on the slide bar; and
controlling the display device to display the display information, on the display screen, having the display number corresponding to the position of the slider on the slide bar.

13. The display apparatus according to claim 1,
wherein the plurality of display information to which the plurality of display numbers are respectively assigned are displayable in the display order on the display screen in the form of a plurality of images respectively corresponding to the plurality of display numbers, and
wherein the one or more processors successively control the display device to display, as to-be-displayed images, one of the plurality of images on the display screen in accordance with the respective display numbers thereof.

14. An input apparatus comprising:
a display device that displays a plurality of display information to which a plurality of display numbers are respectively assigned based on a display order in which the plurality of display information is displayed on a display screen;
a slide-bar portion of the display device in which the display device displays a slide bar whose entire length indicates a total number of all the display information,
wherein respective display numbers of the plurality of display information are assigned to respective detecting areas of the slide bar,
wherein the side bar is divided from one end thereof to an opposite end thereof into the respective detecting areas along a lengthwise direction thereof,
wherein the display device displays a slider on the slide bar such that a position of the slider on the slide bar corresponds to the display number of one of the plurality of display information that is being displayed on the display screen, and
wherein each of the detecting areas detects an approach or a touch of an input object; and
one or more processors that:
detect whether a position change of the input object in the slide bar from a starting position to an ending position occurs during the approach or the touch of the input object, the starting position being the position of the slider displayed on the slide bar before the position change occurs, and the starting position corresponding to a starting point display number of the display information displayed on the display screen before the position change occurs;
obtain a first target display number, which corresponds to the ending position, and a second target display number, which corresponds to an intermediate position on the slide bar,
wherein the intermediate position is between the starting position and the ending position in the lengthwise direction of the slide bar; and
control the display device,
wherein, when the one or more processors detect the position change of the input object from the starting position to the ending position, the one or more processors perform a first display processing in which the display device displays the plurality of display information in the display order from display information to which the starting point display number is assigned to display information to which the second target display number is assigned such that the display number of one of the plurality of display information displayed on the display screen is changed in a unit time by a first display-number-difference value, which is a difference between a display number of display information displayed at a start of the unit time and a display number of display information displayed at an end of the unit time, and
wherein the one or more processors perform, after the first display processing and while the position of the input object is maintained at the ending position in a state in which the input object is held in contact with the slide bar, a second display processing in which the display device displays the plurality of display information in the display order from the display information to which the second target display number is assigned to display information to which the first target display number is assigned such that the display number of the one of the plurality of display information displayed on the display screen is changed in the unit time by a second display-number-difference value which is less than the first display-number-difference value.

* * * * *